United States Patent Office 3,338,658
Patented Aug. 29, 1967

3,338,658
FIXING DYES ON CELLULOSE WITH
BIS(BETA-HALOALKYL)AMINES
Miro Capponi, Muttenz, Basel-Land, Jacques Guenthard, Binningen, Basel-Land, and Christoph Senn, Basel, Switzerland, assignors to Sandoz Ltd. (also known as Sandoz A.G.), Basel, Switzerland
No Drawing. Filed July 1, 1964, Ser. No. 379,705
8 Claims. (Cl. 8—39)

The Swiss Patent No. 362,051 describes and claims a process for the dyeing, padding and printing of animal and synthetic polyamide fibers, which comprises applying to the fibers a dye or a compound capable of dye formation bearing at least one reactive amino or hydroxyl group, treating the thus produced dyeings and prints with water soluble organic compounds bearing at least two radicals splittable as anion which can be the same as or different from each other, and converting into dyes the intermediate compounds capable of dye formation.

As compounds bearing at least two radicals splittable as anion, the tris-($\beta$-chloroethyl)-amine-hydrochloride of the formula

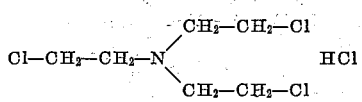
(I)

is especially mentioned.

The present invention is based on the observation that the tris-($\beta$-chloroethyl)-amine-hydrochloride is also excellently suitable for the fixation of dyes or intermediates of the above-described type on cellulosic fibers. However, the tris-($\beta$-chloroethyl)-amine is toxic (nitrogen mustard gas) and as free amine is practically insoluble in water. Therefore other compounds were investigated which should have (1) a good reactivity with amino and/or hydroxyl groups;
(2) a low toxicity or even non-toxicity;
(3) a solubility in water sufficient for the practical application, so that use of mineral acids to convert the amines into water-soluble salts or of expensive organic solvents could be avoided.

It has now been found that the compounds of the formula

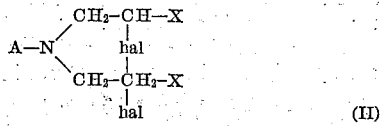
(II)

wherein hal represents chlorine or bromine,
X represents hydrogen or methyl, and
A represents an organic radical containing at least one water-solubilizing group and if desired further substituents, surprisingly fulfill all the above mentioned conditions.

Therefore the present invention concerns a process for fixing dyes on cellulosic fibers, which consists in contacting the said fibers with a solution of a water-soluble dye, preferably of the azo, anthraquinone or phthalocyanine series, or of an organic compound capable of dye formation bearing at least one hydroxyl or amino group and with a solution of a compound of the Formula II, and carrying out the fixation at temperatures of 20° to 200° C. in the presence of acid-binding agents or at 100°–200° C. in the absence of acid-binding agents, the fixed organic compounds capable of dye formation being subsequently converted into dyes by azo coupling.

Preferred compounds of Formula II are those in which the radical A is bound through a methylene group to the nitrogen atom. Thus A, for instance, can be a radical of the formula

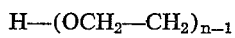

wherein $n$ has an average value of at least 2, e.g. 2 to 20, or of the formula

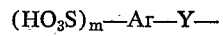

wherein

Ar represents an aromatic hydrocarbon radical, at the most bicyclic, e.g. a benzene, naphthalene or diphenyl radical,
Y represents a low-molecular alkylene radical such as

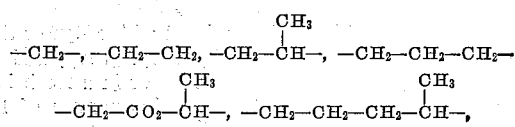

and
$m$ represents one of the integers 1, 2 or 3.

Compounds of this type can be produced, for example, by the addition of ethylene oxide to bis-($\beta$-chloro- or $\beta$-bromo-ethyl)-amine or bis-($\beta$-chloro- or $\beta$-bromo-propyl)-amine, or by sulfonation of N,N-bis-($\beta$-halogenethyl)- or N,N-bis-($\beta$-halogenopropyl)-N-benzylamine, -N-phenylethylamine, -N-naphthylmethylamine or -N-naphthylethylamine. Other suitable compounds of Formula II contain as radical A a mono- or di-carboxylic or -aryl group, e.g.

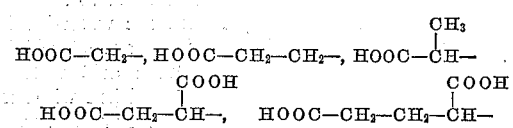

or

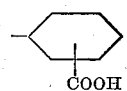

Examples of suitable dyes containing at least one reactive amino or hydroxyl group are: amino- and hydroxy-monoazo and -polyazo dyes and anthraquinone and phthalocyanine dyes which bear one amino or hydroxyl group bound preferably indirectly through an aliphatic chain or an aromatic nucleus to the anthraquinone or phthalocyanine radical. In the azo dyes the amino or hydroxyl group can be found to the chromophoric constituent of the molecule either directly or indirectly through an aliphatic chain or an aromatic nucleus. The aliphatic chains are preferably alkylene chains, such as

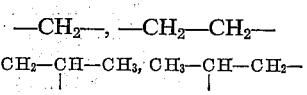

The aromatic nuclei are preferably substituted or unsubstituted phenylene or diphenylene nuclei. The amino group can be monosubstituted by an aliphatic, aromatic, cycloaliphatic or aromatic-aliphatic radical, e.g. methyl, ethyl, 2-hydroxyethyl, 3-methoxypropyl, phenyl, naphthyl, cyclohexyl, benzyl, which may itself be further substituted, or it can be bound to an acyl radical, such as —$SO_2$— or —CO—, and monosubstituted with an aliphatic or aromatic radical, in which case it is present as —$SO_2$—$NH_2$, —$SO_2$—NH—$CH_3$, —$SO_2$—NH—$C_2H_5$, —CO—$NH_2$ or —NH—CO—phenyl.

Compounds containing at least one reactive amino or hydroxyl group and substituents capable of dye formation can be applied to the fiber and, after the treatment with a compound of Formula II, converted into dyes for which purpose azo coupling is preferable.

Suitable compounds of this type are, e.g., aminohydroxynaphthalenes, aminoarylpyrazolones and aminoacylacetylamino compounds and their sulfonic acids:

2-amino-5-hydroxynaphthalene-7-sulfonic acid,
2-amino-8-hydroxynaphthalene-6-sulfonic acid,
1-amino-8-hydroxynaphthalene-3,6- and -4,6-disulfonic acid,
1-(3'- or 4'-amino)-phenyl-3-methyl-5-parazolone,
1-acetoacetylamino-3- or -4-aminobenzene.

The compound of Formula II can be applied to the cellulosic fibers either before, during or after dyeing, padding or printing.

Four important modes of operation of the process can be mentioned:

(1) The material is dyed or printed with a dye or dyes containing a reactive amino or hydroxyl group, and the dyeing or print treated in the dyebath or in a fresh bath with a compound of Formula II, e.g. in amounts of 1 to 20% on the weight of the material, at a temperature of 20 to 100° C. and in the presence of an acid-binding agent. The time of the treatment can be reduced in proportion as the temperature is increased. However, the fixing time depends not only on the temperature, but also on the alkalinity of the acid-binding agent used. When an aqueous sodium hydroxide solution is employed, fixation is completed in less than 1 minute at 100° C., whereas it takes about 1 hour at room temperature (18–20° C.). When sodium hydroxide is replaced by sodium carbonate, sodium bicarbonate or borax, the time of treatment must be several times longer in order to achieve the same good results. If the dyes used are water-insoluble, e.g. disperse dyes, or the intermediates are of sufficiently low aqueous solubility and free from acid water-solubilising groups, fixation can be accomplished without any further addition of strong electrolyte. For water-soluble dyes and intermediates it is advisable to add a strong electrolyte to the fixing solution, e.g. sodium or potassium sulfate or chloride in an amount sufficient to prevent redissolving of the as yet unfixed dye or intermediate.

(2) The dyeing or print is dried and padded with a solution of 1 to 10 parts of a compound of Formula II per 100 parts of water, dried, steamed or preferably thermofixed at 100–200° C., e.g. at 100–150° C. when superheated steam is used or 110–200° C. for dry heat, for 1 to 30 minutes, at an alkaline, neutral or even acid reaction. The time of treatment can be shorter in relation as the temperature is increased.

(3) The padding liquor or printing paste contains a dye having a reactive amino or hydroxyl group, a compound of Formula II and an acid-binding agent. The pad dyeing or print is treated as described under (1) or (2) above, or stored at 20–100° C. under conditions at which the dyeing or print remains in the moist state until fixed.

(4) An aqueous solution of a compound of Formula II is applied to the cellulosic fiber material, which is then dried and padded with a solution of a dye and, if necessary, an acid-binding agent. The material is again dried and fixed as described in (1) or (2) above, or as given under (3) when the padding solution contains an acid-binding agent.

When fixation is effected as described in (1) an acid-binding agent is included in the fixing solution. Examples of suitable acid-binding agents are sodium and potassium carbonate, sodium and potassium bicarbonate, sodium and potassium hydroxide, trisodium phosphate, sodium metasilicate, borax, etc. The optimum amount of acid-binding agent is 2 to 10% on the weight of the goods. It must be sufficiently high to neutralise all the hydrogen halide formed during fixation. The reaction progresses best in the strongly alkaline region, e.g. at pH values of 8 to 11. The same considerations apply to fixation when effected as given under (3) and (4).

In fixation according to (2) above it is possible to work at an alkaline, neutral or even acid reaction. When a salt, e.g. the hydrochloride of a compound of the formula

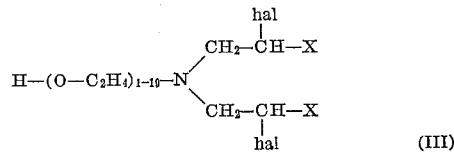

is used, where hal and X have the aforestated meanings, fixation can be carried out without any further additions or with the addition of glacial acetic acid, or the hydrochloride can be neutralised, either wholly or partially, e.g. to 50%, with an alkali (sodium hydroxide or carbonate), or wholly or partially converted with an alkali metal acetate into the corresponding acetate.

The compounds of formula

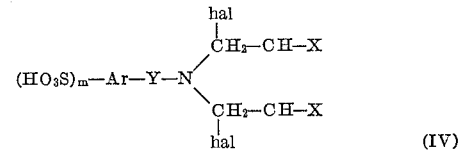

wherein Ar, hal, X, Y and $m$ have the aforestated meanings, can be employed as such or in the form of their neutral salts, e.g. alkali metal or ammonium salts.

The fixation of the dye intermediates can also be carried out according to the above-described four modes of operation of the process.

Compared with the known fixing agent tris-($\beta$-chloroethyl)-amine, which is toxic and boils already at 143–4° C./15 mm. Hg, the compounds of Formula II used in the present process have the advantage of being soluble in water; moreover, the compounds of Formula III have the additional advantage of much higher boiling points, which means a lower vapour pressure and consequently lower toxicity, while the compounds of Formula IV are not volatile at all.

The dyeings obtained have very good wet fastness properties, e.g. fastness to washing, milling, perspiration, water, rubbing, acid and alkalis.

In the following examples the parts and percentages are by weight and the temperatures in degrees centigrade.

*Example 1*

A 2% exhaustion dyeing of Brilliant Yellow (C.I. 24890) on mercerised cotton is rinsed, dried, padded with a solution of 5 parts of N,N-bis-($\beta$-chloroethyl)-ethanolamine per 100 parts of water at room temperature, expressed to a pick-up 70% over the dry weight, and dried. It is then treated for 30 minutes at 60° in a solution of 10 parts of calcined sodium sulfate and 0.5 part of calcined sodium carbonate per 100 parts of water at a liquor ratio 1:30, rinsed in cold and hot water, and dried. A yellow dyeing is obtained which has excellent washing and perspiration fastness.

In place of the aforenamed dye, the following can be used:

Solar Violet BL—C.I. 29125
Carbide Black E—C.I. 30235
Artificial Silk Black CA—C.I. 35435
Diazamine Light Red BWL—C.I. 25210
Solar Blue G—C.I. 34140
Solar Brilliant Blue A—C.I. 27925

The constitutions of these dyes as given in the Colour Index (1956) are:
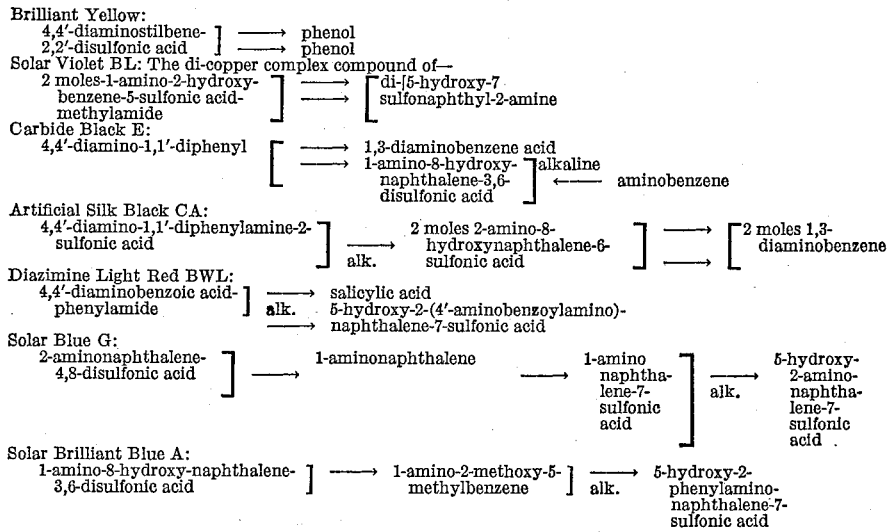
Equally good results are obtained with the di-copper complex compounds of the following diazo dyes:
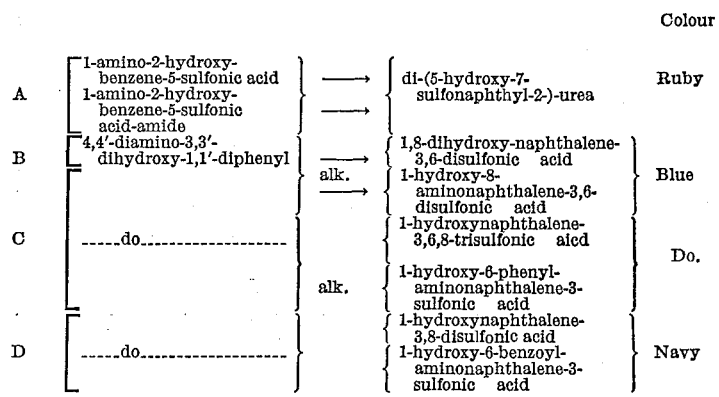
and with the dyes of the following constitutions:
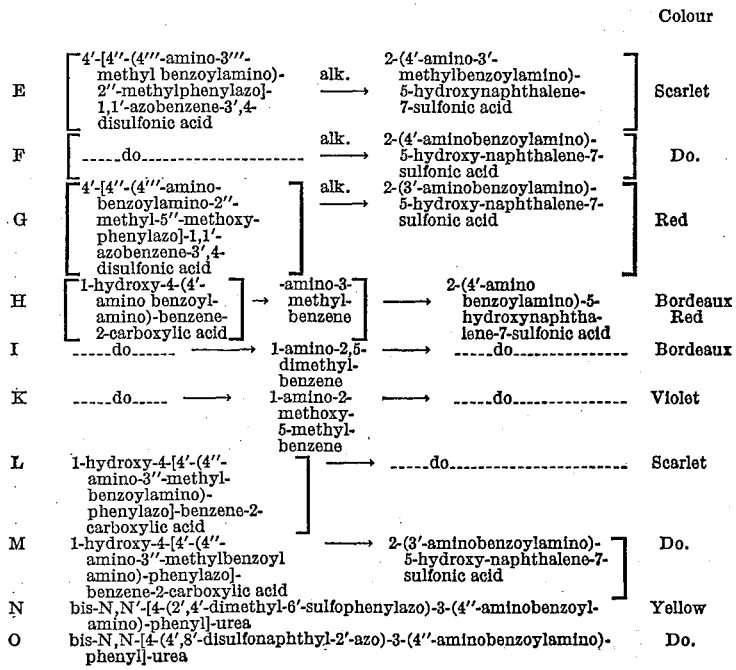

In place of the aforedescribed reactive dichlorine compound, the following compounds can be used with equally good success:

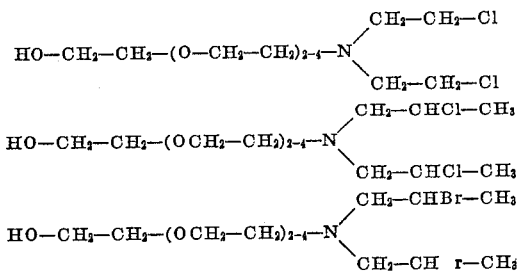

N,N-bis-(β-chloroethyl)-β-aminopropionic acid
N,N-bis-(β-chloropropyl)-β-aminopropionic acid
N,N-bis-(β-chloroethyl)-α-aminopropionic acid
N,N-bis-(β-chloroethyl)-aminoacetic acid
N,N-bis-(β-chloroethyl)-aminosuccinic acid
N,N-bis-(β-chloroethyl)-α-aminoglutaric acid
N,N-bis-(β-chloropropyl)-ethanolamine
N,N-bis-(β-bromoethyl)-ethanolamine

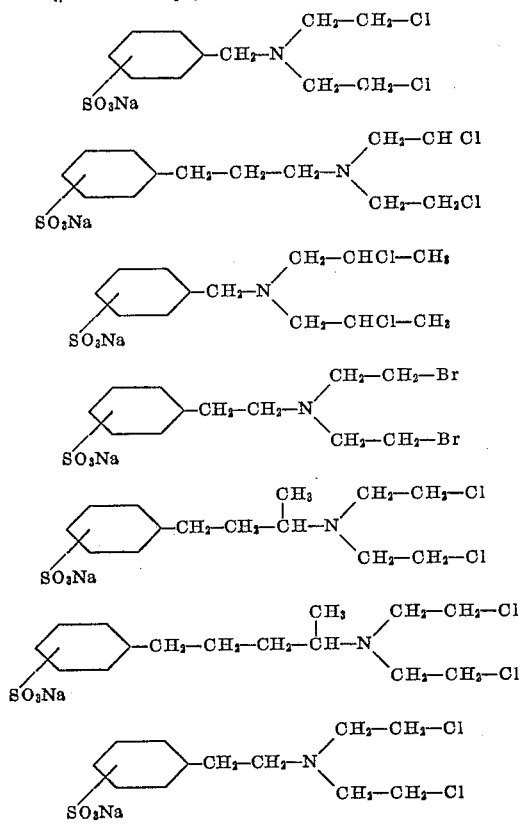

Example 2

A cotton fabric is padded with a solution of 2 parts of Diazamine Light Red BWL (C.I. 25210), 3 parts of urea and 0.3 part of sodium pyrophosphate per 100 parts of water and expressed to an increase of 80% over the dry weight. It is immediately exposed for 5 minutes in a wet steam atmosphere at 103–105°, then rinsed and dried. The fabric is impregnated with a solution of 5 parts of the compound

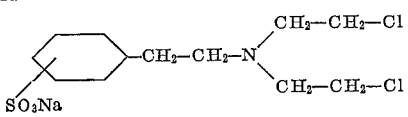

per 100 parts of water, dried, treated for 1 hour at room temperature in a solution of 10 parts of sodium sulfate and 1 part of 30% sodium hydroxide solution per 100 parts of water at a liquor ratio 1:30, rinsed in hot and cold water, and dried. A red dyeing with high wet and perspiration fastness is obtained.

The dyes and reactive compounds described in Example 1 can be applied by this procedure with equally good success.

Example 3

A 2% dyeing of the dye (H) is produced by any desired method and subsequently padded with a solution of 5 parts of the compound

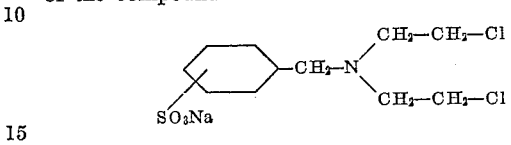

per 100 parts of water, dried, fixed on the jig for at least 10 minutes at 60° and a liquor ratio 1:3 in a solution of 10 parts of sodium sulfate and 5 parts of 30% sodium hydroxide solution per 100 parts of water, rinsed with overflow, soaped and dried. A wine-red dyeing of high wet fastness is obtained. Equally good results are obtained when the dyes and reactive compounds named in Example 1 are applied by this method.

Example 4

A 2% dyeing of Solar Brilliant Blue A (C.I. 27925) is continuously padded with a solution of 3 parts of N,N-bis-(β-chloroethyl)-β-aminopropionic acid per 100 parts of water, expressed to an 80% increase over the dry weight, dried, and fixed in an open width washing machine for at least one minute at 90–95° and a liquor ratio 1:40 using a solution of 5 parts of 30% sodium hydroxide solution, 0.1 part of sodium 3-nitrobenzenesulfate and 10 parts of sodium sulfate per 100 parts of water. The fabric is then rinsed with overflow, soaped, rinsed again and dried. In comparison with the original dyeing, the dyeing thus aftertreated is notable for its excellent wet fastness properties. This procedure can be performed with equally good success for dyeings of the dyes described in Example 1 and using any other of the reactive compounds named in that example.

Example 5

Cotton fabric is padded with a solution of 2 parts of the dye

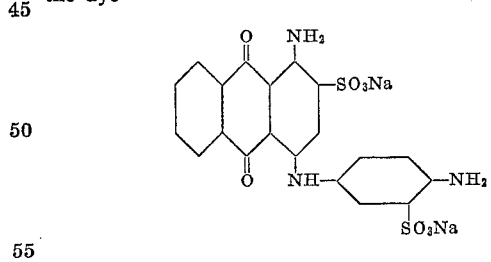

per 100 parts of water, expressed to a pick-up of 80% of the dry weight, and dried. The fabric is then padded on a second padding machine with a solution of 5 parts of N,N-bis-(β-chloroethyl)-ethanolamine per 100 parts of water at an expression of 100%, dried, and fixed in one of the alkaline solutions defined in Examples 1 to 4, the liquor ratios, temperatures and fixing times being as given in those examples and the amount of sodium sulfate in the fixing solution being increased from 10 to 30 parts. A navy blue dyeing with outstandingly good wet fastness properties is obtained.

Equally good results are obtained when the other reactive compounds described in Example 1 are used. When, in place of the dye of the above formula, one of the dyes enumerated in the following is used, equally good results are obtained.

1 - hydroxy-2-[4'-(2''-methylphenylazo)-2'-methylphenylazo]-6-(meta- or para-amino-benzoylamino)-naphthalene-3,4''-disulfonic acid, 1 - [[4' - [4" - (4'" - aminophenylazo)-naphthyl-1"'-azo]-naphthyl - 1'-azo]]-2-hydroxynaphthalene-6,6',6"-trisulfonic acid, 4 - (4" - hydroxy) - phenylazo-4'-(1"'-hydroxy)-naphthyl - (2"') - azo-5,5'-dimethyl-1,1'-diphenyl-2,2',4"'-trisulfonic acid, 1 - (2' - amino) - naphthyl-(1')-azobenzene-2,6'-disulfonic acid-5-sulfonic acid-(β-aminoethylamide), 2 - [4' - (4" - aminophenylazo)-phenylazo]-naphthalene-4,6,8-trisulfonic acid, 1 - amino - 4 - (3'-amino-4'-methylphenylamino)-anthraquinone-2,6'-disulfonic acid and -2,6,6'-trisulfonic acid, 1 - amino - 4 - [4'-(3"-aminophenylaminocarbonyl)-phenylamino]-anthraquinone-2,4"-disulfonic acid, 1 - amino - 4 - (4'-aminophenylamino)-anthraquinone-2-sulfonic acid-3'-sulfonic acid-(β-hydroxyethylamide), 1 - amino - 4 - (3'-aminocarbonylphenylamino)-anthraquinone-2-sulfonic acid, 1 - amino - 4 - (4'-aminophenylamino)-anthraquinone-2-sulfonic acid or -2,5-, -2,8- or -2,6-disulfonic acid, 1 - amino - 4-(3'-aminophenylamino)-anthraquinone-2,4'-disulfonic acid, 1 - amino - 4-(4'-aminophenylamino)-anthraquinone-2,3'-disulfonic acid, 1 - amino - 4 - (3'-aminophenylamino)-anthraquinone-2-sulfonic acid, 1 - amino - (4'-methylaminophenylamino)-anthraquinone-2,2'-disulfonic acid, copper phthalocyanine-trisulfonic acid-sulfonic acid-(4'- or 3'-aminophenylamide), copper phthalocyaninesulfonic acid-disulfonic acid amide-sulfonic acid-(3'-aminophenylamide), copper phthalocyaninedisulfonic acid-sulfonic acid amide-sulfonic acid-(3'-aminophenylamide), the 1:1-chromium complex compound of the dye 1 - (3' - aminosulfonylphenyl)-3-methyl-4-(2"-hydroxy-5"-nitrophenylazo)-5-pyrazolone, the 1:2 chromium and 1:2 cobalt complex compounds of the dyes 1 - hydroxy-2-(2'-hydroxynaphthyl-1'-azo)-benzene-4-sulfonic acid-(γ-methoxypropylamide) and 1 - phenyl - 3 - methyl-4-(2'-hydroxy-5'-methylaminosulfonyl-phenylazo)-5-pyrazolone.

*Example 6*

A cellulosic fabric is padded with a solution of 20 parts of the dye

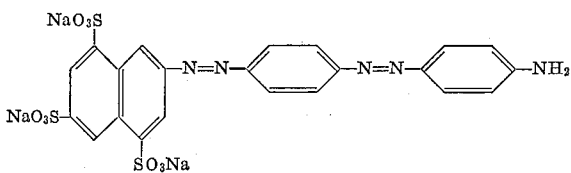

per 100 parts of water, dried, impregnated on a pad with a solution of 10 parts of the sodium salt of N,N-bis-(β-chloroethyl)-benzylamine-2,4-disulfonic acid, 6 parts of 30% sodium hydroxide solution and 3 parts of sodium sulfate per 100 parts of water. The fabric is rolled up in the moist state, wrapped in airtight polyvinyl chloride film to prevent evaporation, and stored for at least 12 hours at room temperature. Subsequently the fabric is rinsed in cold and hot water, soaped if necessary, and dried. The dyeing is of a deep brown shade and has excellent wet fastness properties.

In place of the dye of the above formula, any of the dyes described in Examples 1 to 5 can be used with equally good results. The same applies when the reactive compound named in this example is replaced by

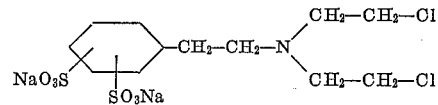

or by one of the compounds specified in Example 1.

*Example 7*

A mercerised cotton fabric is padded with a solution of 2 parts of the dye

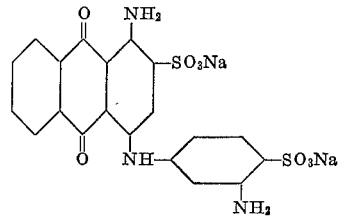

per 100 parts of water and dried. It is then impregnated with a solution of 10 parts of the reactive compound mentioned in the last paragraph of Example 6; 1 part of sodium 3-nitrobenzenesulfonate and 5 parts of calcined sodium carbonate per 100 parts of water, rolled up and fixed by storage in a moist atmosphere for 5 hours at 70°, followed by rinsing and drying. The blue dyeing obtained has excellent wet fastness properties.

Equally good results are obtained with the other dyes and reactive components specified in Examples 1, 5 and 6.

*Example 8*

A narrow cotton fabric is continuously padded with a solution of 2 parts

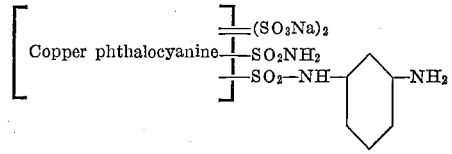

expressed to a pick-up of 70% over the dry weight and dried on a hot flue or in a jet drier. It is impregnated on a second pad with a solution of 10 parts of N,N-bis-(β-chloroethyl)-benzylamine-2,4-disulfonic acid, 10 parts of potassium carbonate and 5 parts of urea in 100 parts of water and expressed to a pick-up of 80%. This is followed by drying in a suitable drier, fixation in dry heat for 5 minutes at 150°, rinsing, soaping and drying. A turquoise-blue dyeing of high wet fastness is obtained. Instead of dry heat, fixation can be effected in wet steam at 103–104° for 10 minutes with the same result, only in this case the second padding solution must contain additionally 1 part of sodium 3-nitrobenzenesulfonate.

The other dyes and reactive compounds described in Examples 1, 5 and 6 can be applied on analogous lines to give dyeings with high wet fastness properties.

*Example 9*

A bleached, mercerised cotton fabric is padded at room temperature with a solution containing, per 100 parts of water, 2 parts of the 1:1 chromium complex compound of the dye 1 - (3'-aminosulfonylphenyl)-3-methyl-4-(2"-hydroxy-5"-nitrophenylazo) - 5 - pyrazolone, 10 parts of sodium N,N - bis - (β-chloroethyl)-benzylamine-2,4-disulfonate, 10 parts of urea and 5 parts of sodium bicarbonate, with an expression to give an increase of 80% over the dry weight. The fabric is dried in a jet drier or on a hot flue at a temperature of about 100°, fixed by exposure for 5 minutes in dry air at 150°, rinsed well with hot and cold water, and dried. The dyeing has excellent wet fastness properties. When 1 part of sodium 3-nitrobenzenesulfonate is included in the padding liquor, the dyeing can be fixed by treatment for 10 minutes in wet steam at 104–105°.

In place of the stated reactive compound the compound mentioned in the last paragraph of Example 6 can be used with equally good success.

The other dyes specified in Example 5 can be applied with equally good results.

*Example 10*

A fabric of natural or regenerated cellulosic fiber is padded with a solution containing, per 100 parts of water, 2 parts of the 1:2 chromium complex compound of the dye 1 - (2′,5′-dichlorophenyl)-3-methyl - 4 -(2″-hydroxyphenylazo) - 5 - pyrazolone-5″-sulfonic acid-methyl-amide, 2.5 parts of 30% sodium hydroxide solution, 5 parts of sodium metasilicate and 10 parts of the compound mentioned in the last paragraph of Example 6.

The fabric is expressed to a pick-up of 80% over the dry weight, rolled up in the moist state, wrapped in polyvinyl chloride film to prevent evaporation, and stored for at least 12 hours at 25° or alternatively for 2 hours at 70°, after which it is rinsed well and dried. An orange dyeing of high wet fastness is obtained.

Equally good results are obtained when in place of the aforestated reactive compound, sodium N,N-bis-(β-chloroethyl)-benzylamine - 2,4 - disulfonate is used. The other dyes named in Example 5 can be applied and fixed equally successfully by the procedure described in this example.

*Example 11*

A cotton fabric is impregnated with a solution containing, per liter, 20 grams of the dye used in Example 6 and 20 grams of N,N-bis-(β-chloroethyl) - ethanolamine-hydrochloride, expressed to an increase of 80% over the dry weight, dried, and fixed by treatment in dry heat for 5 minutes at 150°. It is then rinsed with cold and warm water and dried. The resulting brown dyeing has high wet fastness, but the mechanical properties of the dyed fabric are poorer than before fixation because the cellulosic fiber is damaged by the action of the acid reactive compound; the first rinsing water registers a marked acid reaction with a pH value of about 3.

When fixation is effected by treatment in wet steam for 5 minutes at 102–104° instead of in dry heat, the fixing yield is decreased to 30–40% but only slight fiber damage occurs.

The N,N-bis-(β-chloroethyl)-ethanolamine hydrochloride can be neutralised with an alkali, e.g. sodium hydroxide, carbonate or acetate, so that the free amine or the acetate is present, or a slight excess of alkali can be added so that besides the hydrogen chloride of the hydrochloride a proportion of the hydrogen chloride liberated during fixation is neutralised, upon which heavy brown dyeings are obtained without damage to the fiber.

*Example 12*

A cotton fabric is padded with a solution containing, per liter, 20 grams of the dye of the formula

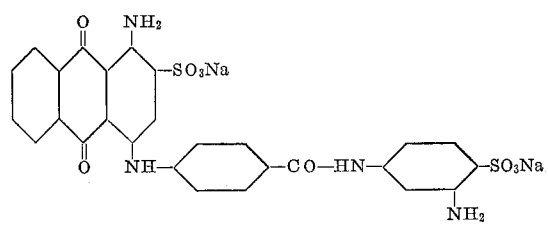

and 30 grams of N,N-bis-(β-chloroethyl)-benzylamine-sulfonic acid. The subsequent procedure is the same as that described in Example 11. A blue dyeing of high fastness to wet treatments is obtained, but the cellulosic fiber is appreciably damaged.

When the N,N - bis - (β-chloroethyl)-benzylamine-sulfonic acid is replaced by its sodium or potassium salt, or an equivalent amount of sodium or potassium acetate is added to the padding solution, a blue dyeing of similarly high wet fastness is obtained without damage to the fiber.

When the 30 grams of N,N-bis-(β-chloroethyl)-benzylamine-sulfonic acid are replaced by 20 grams of N,N-bis-(β-chloroethyl)-ethanolamine hydrochloride and fixation is carried out by steaming for 5 minutes at 102–104°, a blue dyeing of high light fastness is obtained without appreciable damage to the fiber.

*Example 13*

Mercerized cotton fabric is impregnated at 30° on the pad with a solution of 2 parts of N,N-bis-(β-chloroethyl)-ethanolamine and 1.5 parts of sodium 1-amino-8-hydroxynaphthalene - 3.6 - disulfonate in 100 parts of water, squeezed to give an increase of 80% on its dry weight and dried on a hot flue. The dried fabric is then treated on a jigger for 30 minutes at 60° with a solution containing 30 parts of calcined sodium sulfate and 1 part of 30% sodium hydroxide solution in 100 parts of water and rinsed with cold and with hot water. The shade is developed by treatment for 5 minutes in a cold solution (liquor ratio 30:1) of the diazo compound of 1 gram per liter of 1-amino-benzene-2-sulfonic acid in presence of sodium acetate and sodium bicarbonate. The bluish red dyeing obtained is fast to washing and rubbing.

If the padding solution also contains 2 parts of sodium bicarbonate, the fixation can be carried out by steaming for 5 minutes at 102–104° or by dry heat treatment for 5 minutes at 150°.

If the fixing agent is replaced by the same amount of sodium N,N - bis - (β-chloroethyl)-benzylamine-2,4-disulfonate or sodium N,N-bis-(β-chloropropyl)-benzylamine-2,4-disulfonate, similar results are obtained.

*Example 14*

Mercerized cotton fabric is impregnated at 25° on the pad with a solution of 2 parts of the N,N-bis-(β-chloroethyl)-ethanolamine, 1.5 parts of sodium 2,4-diaminobenzene-1-sulfonate and 2 parts of sodium carbonate, squeezed to an increase of 70% on its dry weight, dried and fixed by thermofixation for 4 minutes at 150°. The fabric is then rinsed with cold and with hot water, diazotized for 15 minutes at 10–15° in a solution of 1 gram per liter of sodium nitrite and 3 ml. per liter of concentrated hydrochloric acid (liquor ratio 25:1). After rinsing with cold water, the shade is developed by treatment for 15 minutes in a cold bath containing 1 gram per liter of sodium 1-(2′,5′-dichloro)-phenyl-3-methyl-5-pyrazolone-4′-sulfonate and 5 grams per liter of sodium acetate, rinsed and dried. The greenish yellow dyeing thus produced is fast to washing and rubbing.

A red or orange dyeing fast to washing and rubbing is obtained when the developing bath contains, in place of the above additions, 1 gram per liter of sodium 1-benzoyl-amino-8-hydroxynaphthalene-3,6-disulfonate or sodium 2-hydroxynaphthalene-3,6-disulfonate and 2 grams per liter of sodium bicarbonate.

The following table contains further examples which can be carried out according to the details given in Examples 13 and 14. They are characterized by the diazo and coupling components used and by the shade of the dyeings on cotton in Columns (I) to (III). The group by which the final dye is connected through the fixing agent to the cellulose molecule is underlined.

| Ex. No. | Diazo Component (I) | Coupling Component (II) | Shade of the Dyeing on Cotton (III) |
|---|---|---|---|
| 15 | 1-amino-4-amino-benzene-2-sulfonic acid | 1-hydroxynaphthalene-3,6-disulfonic acid | Brownish red. |
| 16 | ----do---- | 1-acetoacetylamino-benzene-4-sulfonic acid | Yellow. |
| 17 | 4-amino-4'-amino-1,1'-diphenyl-3-sulfonic acid | 2-acetoacetylamino-naphthalene-7-sulfonic acid | Do. |
| 18 | ----do---- | 1-phenyl-3-methyl-5-pyrazolone-4'-sulfonic acid | Do. |
| 19 | ----do---- | 2-acetylamino-5-hydroxy-naphthalene-7-sulfonic acid | Reddish orange. |
| 20 | 4-amino-4'-amino-2,2'-dimethyl-1,1'-diphenyl-5-sulfonic acid. | 2-benzoylamino-8-hydroxy-naphthalene-6-sulfonic acid. | Orange. |
| 21 | ----do---- | 1-naphthyl-(1')-3-methyl-5-pyrazolone-4'-sulfonic acid. | Yellow. |
| 22 | ----do---- | 2-(4'-methyl)-phenylsulfonylamino-8-hydroxy-naphthalene-3,6-disulfonic acid. | Red. |
| 23 | ----do---- | 1-phenyl-5-pyrazolone-3,4'-dicarboxylic acid | Yellow. |
| 24 | ----do---- | 1-hydroxy-2-sulfoacetyl-amino-4-methyl-benzene | Do. |
| 25 | 4-amino-4'-amino-2,2'-dimethoxy-1,1'-diphenyl-5-sulfonic acid. | 2-hydroxy-naphthalene-6,8-disulfonic acid | Orange. |
| 26 | ----do---- | 1-phenyl-3-methyl-5-pyrazolone-3'-sulfonic acid | Yellow. |
| 27 | ----do---- | 1-acetoacetylamino-naphthalene-5,7-disulfonic acid. | Do. |
| 28 | 4-amino-4'-amino-2,2'-diethoxy-1,1'-diphenyl-5-sulfonic acid. | 1-hydroxynaphthalene-4-sulfonic acid | Scarlet. |
| 29 | 4-amino-4'-amino-2,2'-dichloro-1,1'-diphenyl-5-sulfonic acid. | 1-propionylamino-8-hydroxy-naphthalene-4-sulfonic acid. | Red. |
| 30 | 4-amino-4'-amino-2,2'-dichloro-1,1'-diphenyl-5-sulfonic acid. | 1-(4'-chloro)-benzoylamino-8-hydroxy-naphthalene-4,6-disulfonic acid. | Red. |
| 31 | 1-amino-benzene-2-sulfonic acid | 1-amino-8-hydroxy-naphthalene-4,6-disulfonic acid. | Red. |
| 32 | 4-amino-1,1'-azobenzene-3,4'-disulfonic acid | 2-amino-8-hydroxy-naphthalene-6-sulfonic acid | Red. |
| 33 | 2-aminonaphthalene-1-sulfonic acid | ----do---- | Red. |
| 34 | ----do---- | 1-amino-4-acetoacetyl-amino-benzene-2-sulfonic acid. | Yellow. |
| 35 | 1-amino-2-chloro-4-nitrobenzene | 2-amino-5-hydroxynaphthalene-7-sulfonic acid | Red-orange. |
| 36 | ----do---- | 1-(3'-amino)-phenyl-3-methyl-5-pyrazolone-6'-sulfonic acid. | Do. |
| 37 | 4-amino-1,1'-azobenzene-3,4'-disulfonic acid | 1-(3'-amino-4'-methyl)-phenyl-5-pyrazolone-3-carboxylic acid-5'-sulfonic acid. | Orange. |
| 38 | ----do---- | 1-amino-8-hydroxy-naphthalene-3,6-disulfonic acid. | Violet. |
| 39 | Aminobenzene | 2-amino-5-hydroxy-naphthalene-7-sulfonic acid | Orange. |
| 40 | 1-amino-4-nitrobenzene | ----do---- | Reddish orange. |
| 41 | 1-amino-naphthalene-4-sulfonic acid | ----do---- | Scarlet. |
| 42 | 1-amino-naphthalene-4,6-disulfonic acid | ----do---- | Do. |
| 43 | 2-amino-naphthalene-4,8-disulfonic acid | ----do---- | Orange. |
| 44 | 1-amino-naphthalene-6-(7)-sulfonic acid | ----do---- | Scarlet. |
| 45 | 1-amino-naphthalene-6-(7)-sulfonic acid | 1-(4'-amino)-benzoylamino-8-hydroxy-naphthalene-3,6-disulfonic acid. | Violet. |
| 46 | 1-amino-4-methylbenzene | ----do---- | Bluish red. |
| 47 | 1-amino-benzene-3-sulfonic acid | 2-amino-8-hydroxy-naphthalene-6-sulfonic acid | Scarlet. |
| 48 | 1-amino-4-chlorobenzene | ----do---- | Do. |
| 49 | 1-amino-benzene-4-sulfonic acid | 1-amino-4-acetoacetylamino-benzene-3-sulfonic acid. | Yellow. |
| 50 | 4-amino-1,1'-azobenzene-4'-sulfonic acid | 1-(3'-amino)-phenyl-3-methyl-5-pyrazolone-6'-sulfonic acid. | Orange. |
| 51 | 1-amino-3-amino-benzene-6-sulfonic acid | 1,8-dihydroxy-naphthalene-3,6-disulfonic acid | Bluish red. |

Having thus disclosed the invention what we claim is:

1. A process for the fixation of dyes on cellulosic fibers which consists essentially of contacting the said fibers with a solution of a dye selected from the group consisting of water-soluble azo, anthraquinone and phthalocyanine dyes bearing at least one substituent selected from the group consisting of amino and hydroxyl groups and with a solution of a compound of the formula

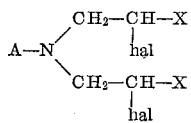

wherein hal is a member selected from the group consisting of chlorine and bromine, X is a member selected from the group consisting of hydrogen and methyl and A is a member selected from the group consisting of $$H—(O—CH_2—CH_2)_n—1—$$

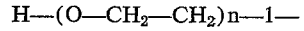

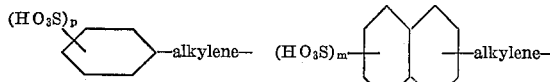

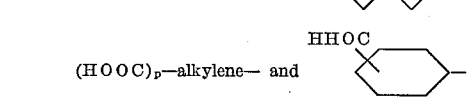

alkylene being low molecular, $n$ having an average value of 2 to 20, $m$ being an integer from 1 to 3, inclusive, and $p$ being an integer from 1 to 2, inclusive, and fixing the dye on said fibers within the temperature range of from 20° to 200° C.

2. A process according to claim 1, wherein the dye is a water-soluble metal-free polyazo dye.

3. A process according to claim 1, wherein the dye is a water-soluble metallized polyazo dye.

4. A process for the fixation of dyes on cellulosic fibers which consists essentially of contacting the said fibers with a solution of a dye intermediate which is capable of azo dye formation and bears at least one substituent selected from the group consisting of amino and hydroxyl groups and with a solution of a compound of the formula

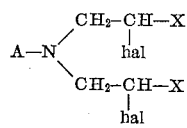

wherein hal is a member selected from the group consisting of chlorine and bromine, X is a member selected from the group consisting of hydrogen and methyl, and A is a member selected from the group consisting of H—(O—CH$_2$—CH$_2$)n—1—

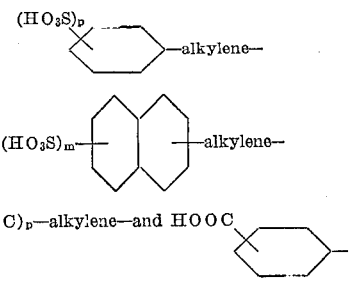

alkylene being low molecular,
n having an average value of 2 to 20,
m being an integer from 1 to 3, inclusive, and
p being an integer from 1 to 2, inclusive, fixing the dye intermediate on said fiber within the temperature range of from 20° to 200° C., and converting the fixed dye intermediate into an azo dye by azoic coupling.

5. A process according to claim 1 wherein the dye is water-soluble azo dye.

6. A process according to claim 1 wherein the dye is anthraquinone dye.

7. A process according to claim 1 wherein the dye is phthalocyanine dye.

8. In fixing dye on cellulosic fiber at a temperature within the range of from 20° to 200° C., the improvement wherein the dye structure includes at least one substituent selected from the group consisting of amino and hydroxyl, the dye is a water-soluble member selected from the group consisting of azo dye, anthraquinone dye and phthalocyanine dye, and the cellulosic fiber has been contacted with a solution of the dye and with a solution of a member selected from the group consisting of a compound of the formula

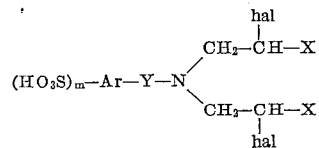

wherein
Ar is a member selected from the group consisting of phenylene, naphthylene and diphenylene;
hal is a member selected from the group consisting of chloro and bromo;
X is a member selected from the group consisting of hydrogen and methyl;
Y is lower alkylene; and
m is one of the integers, 1, 2 and 3;
and a neutral salt thereof.

References Cited

UNITED STATES PATENTS

| 2,131,146 | 9/1938 | Schlack | 8—7 |
| 2,708,617 | 5/1955 | Magat et al. | 9—115.5 |
| 3,008,795 | 11/1961 | Honold | 8—88 |
| 3,066,005 | 11/1962 | Wedemeyer | 8—54.2 |
| 3,078,242 | 2/1963 | Morgan | 8—100 |

FOREIGN PATENTS

| 383,634 | 11/1932 | Great Britain. |
| 922,683 | 4/1963 | Great Britain. |

OTHER REFERENCES

Fieser et al.: Organic Chemistry, p. 229, published 1956, by Reinhold Pub. Corp., N.Y.C.

NORMAN G. TORCHIN, *Primary Examiner.*

DONALD LEVY, *Examiner.*

UNITED STATES PATENT OFFICE
CERTIFICATE OF CORRECTION

Patent No. 3,338,658                          August 29, 1967

Miro Capponi et al.

It is hereby certified that error appears in the above numbered patent requiring correction and that the said Letters Patent should read as corrected below.

In the heading to the printed specification, between lines 8 and 9, insert -- Claims priority, application Switzerland, July 5, 1963, 8,381/63 --; column 1, lines 48 to 52, the formula should appear as shown below instead of as in the patent:

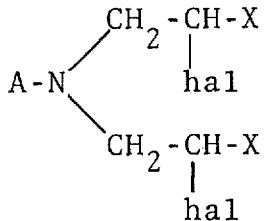

column 2, lines 19 to 21, the first formula should appear as shown below instead of as in the patent:

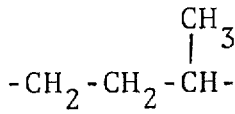

same column 2, line 32, for "di-carboxylic" read -- di-carboxyalkyl --; lines 34 and 35, after

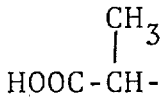

insert a comma; lines 40 to 43, after the formula insert a period; line 52, for "found" read -- bound --; line 56, after "-CH$_2$-CH$_2$-" insert a comma; same column 2, line 58, after "CH$_3$-CH-CH$_2$-" insert a comma; column 3, line 14, for "-parazolone" read -- -pyrazolone --; column 4, lines 26 to 32, the formula should appear as shown below instead of as in the patent

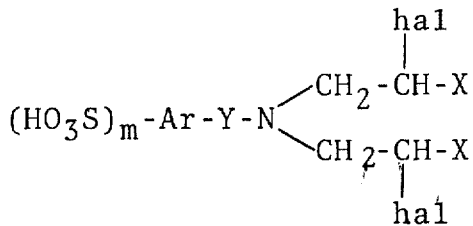

column 5, dye H, for "-amino-3-methylbenzene" read -- 1-amino-3-methylbenzene --; column 7, lines 11 to 15, for that portion of the formula reading $\diagdown CH_2-CH\ r-CH_3$    read    $\diagdown CH_2-CHBr-CH_3$ lines 29 to 32, for that portion of the formula reading $\diagup CH_2-CHCl$    read    $\diagup CH_2-CH_2Cl$ column 10, line 24, for "6;" read -- 6, --; column 11, line 25, after "when" insert a comma; column 12, line 23, for "3.6" read -- 3,6 --; columns 13 and 14, in the table, second column, line 1 thereof, for "-4-amino-" read -- -4-<u>amino</u>- --; same table, second column, lines 3, 6, 12, 16, 18 and 20, for "-4′-amino-", each occurrence, read -- -4′-<u>amino</u>- --; same table, second column, last line thereof, for "-3-amino-" read -- -3-<u>amino</u>- --; same table, third column, lines 24, 26, 28, first occurrence, 30, 31, 33, 35, 37, 43, 46, 48 and 50, for "-amino", each occurrence, read -- -<u>amino</u> --; column 13, line 65 and column 15, line 2, for "H-(O-CH$_2$-CH$_2$)n-1-", each occurrence, read -- H(O-CH$_2$-CH$_2$)$_{n-1}$- --; same column 13, lines 71 to 74, the formula should appear as shown below instead of as in the patent:

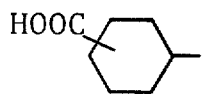

column 15, line 14, for "-alkylene-and" read -- -alkylene- and --.

Signed and sealed this 5th day of November 1968.

(SEAL)
Attest:

EDWARD M. FLETCHER, JR.                        EDWARD J. BRENNER
Attesting Officer                                  Commissioner of Patents